Jan. 8, 1924.  1,479,973
A. T. STURT ET AL
CLUTCH.
Filed April 24, 1922

INVENTOR.
A.T. Sturt
G.H. Robinson
ATTORNEY.

Patented Jan. 8, 1924.

1,479,973

UNITED STATES PATENT OFFICE.

ALFRED T. STURT, OF FLINT, MICHIGAN, AND GEORGE H. ROBINSON, OF NEW YORK, N. Y., ASSIGNORS TO DURANT MOTORS INCORPORATED, A CORPORATION OF DELAWARE.

CLUTCH.

Application filed April 24, 1922. Serial No. 556,248.

*To all whom it may concern:*

Be it known that we, ALFRED T. STURT and GEORGE H. ROBINSON, citizens of the United States, and residents, respectively, of Flint, county of Genesee, State of Michigan, and borough of Manhattan, city and State of New York, have jointly invented certain new and useful Improvements in Clutches, of which the following is a specification.

This invention relates to an improved clutch adapted for use on motor vehicles and to an improved clutch plate which permits a gradual engagement between the driving member and a driven member without the use of numerous and costly parts. More particularly, the invention relates to a clutch plate suitable for use in clutch assemblies of the type illustrated in our copending application Serial No. 492,949, filed August 17th, 1921.

In this type of clutch the opposite faces of a clutch plate are gripped by pressure plates or surfaces which rotate with the drive shaft, a gradual engagement being obtained by providing the peripheral portion of the clutch plate with a number of kerfs and slightly inclining its faces to the gripping or pressure surfaces. As the pressure surfaces contact with the clutch plate the edges of the plate are first engaged with a slight or moderate pressure and with increasingly greater pressure as the edges of the plate are compressed and flexed to provide a greater contact surface and an increased surface pressure.

An object of the present invention is to provide an improved clutch plate suitable for clutch assemblies of the above type.

Another object of the invention is to provide a clutch plate and mats so arranged that the mats yieldingly engage the pressure rings throughout the surface of the mats in all positions of contact.

Another object of the invention is to provide a clutch plate with peripheral kerfs and friction pads so arranged near said periphery between said kerfs as to permit the sectors between said kerfs to be displaced in opposite directions under increasing pressure as said clutch plate is gripped between driving pressure surfaces.

A still further object of the invention is to provide an improved clutch assembly in which the use of floating friction rings or mats are avoided.

With these and other objects in view, the invention comprises the clutch device described and set forth in the following specification and claims.

The various features of the invention are illustrated in the accompanying drawings, in which:

Fig. 1 is an end view of a clutch plate embodying a preferred form of the invention and a driven or transmission shaft on which the plate is mounted.

Fig. 2 is a sectional view of the clutch plate and transmission shaft taken on line 2—2 of Fig. 1.

Fig. 3 is a detail sectional view of a portion of the clutch plate shown in Figs. 1 and 2 and pressure surfaces adapted to co-operate therewith.

Fig. 4 is a plan view of a friction pad forming a part of the clutch plate shown in Fig. 1, and, Fig. 5 is a detail view of a kerf in the clutch plate shown in Fig. 1.

In the present invention a clutch plate is provided with a flat peripheral portion which is divided by short kerfs into a number of segments or sectors which have considerable stiffness but may be slightly flexed from their normally flat or plane position by the application of pressure on the sides of the sectors. A friction pad is mounted on the face of each sector, the pads being alternately mounted on opposite sides or faces of the plate so that, as the rotating clutch driving plates press against the sides of the pads on throwing in the clutch, the adjacent sectors are distorted or flexed in opposite directions, the pressure increasing as the plates are brought closer together. The central portion of the clutch plate is connected to a driven or transmission shaft and is of a dished or conoid shape to give the plate the desired strength and stiffness.

Referring more particularly to the accompanying drawings, motion is transmitted from a driving shaft or motor to a clutch plate 10 by two oppositely disposed pressure plates 12 and 14, Fig. 3, which rotate with the driving shaft and may be pressed toward each other by any suitable means to contact with, and grip, a flat peripheral portion 16 of the clutch plate positioned between these plates at a right angle to the axis of rotation. The peripheral portion 16 of the disc 10 is divided into a number of segments or sectors 18 by means of a number of radial kerfs 20 which extend from the circumference of the disc to a dished or conoid central portion 22 of the plate on which a driven or transmission shaft 24 having a spiral oil groove is mounted. The sectors 18 are normally in a single plane and are of sufficient stiffness to resist distortion or flexing from this position but have sufficient resiliency to permit their being slightly flexed by the exertion of sufficient side pressure.

A number of friction pads 26 are mounted on the faces of the sectors 18 in position to contact with the inner faces of the pressure plates as the plates are brought close to the faces of the clutch disc. The friction pads are mounted alternately on opposite sides of adjacent sectors so that as the pressure plates are advanced sufficiently to exert pressure on the pads they tend to flex adjacent sectors in opposite directions. As the pressure plates first come into contact with the friction pads they do not distort or flex the sectors to any considerable extent and but a very slight friction between the pads and the pressure surfaces is provided which permits a certain amount of slip between the pads and the plates to take place and provides only a very gradual driving of the disc. As the pressure plates are brought closer together the sectors are distorted or flexed somewhat more with the exertion of greater friction between the friction pads and the pressure surfaces until the disc and the driving pressure surfaces are substantially in locked position and rotate at substantially the same speed. Through this arrangement a very gradual picking up of speed by the transmission shaft is insured with a minimum of operating parts. The arrangement of pressure plates and means for advancing them shown in our co-pending application Serial No. 492,949 may be used or any other suitable means may be used for this purpose.

The friction pads are preferably given the shape of segments of an annular ring as illustrated in Fig. 4 and have sufficient length to extend over the width of the sectors 18 and beyond to a distance equal to that of the kerfs 20. The pads may be attached to the sectors by means of rivets 28 and the inner faces adjacent the disc are tapered or bevelled slightly from the rivets toward the ends as indicated at 30 and 32 in Fig. 3, this tapered form being found advantageous in operation.

The inner corners of the kerfs 20 are chamfered or rounded as shown in Fig. 5 to lessen the tendency of the kerfs to start a break or to tear as the sectors are distorted or flexed. The inner or central portion of the disc is flatened at 34 and attached to the driven or transmission shaft by means of bolts 36 or other fastening means.

The above invention provides a clutch device in which the friction pads are subjected to uniform wear throughout their contact surfaces and in which a gradual take up is insured with a minimum of parts. An extremely compact and simple clutch plate is also provided in which floating friction rings and other parts which might get out of order are avoided.

Having described the invention, what we claim and desire to secure by Letters Patent is:

1. A device of the kind described which comprises a plate having a flat peripheral portion, said portion being divided into a number of sectors by kerfs extending inwardly from the circumference and friction pads arranged alternately on opposite sides of said sectors.

2. A device of the kind described which comprises a plate having a flat peripheral portion, said portion being divided into a number of sectors by radial kerfs extending inwardly from the circumference and friction pads extending across said sectors arranged alternately on opposite sides of said plate.

3. A device of the kind described which comprises a circular plate having a flat peripheral portion and a central conoidal portion, said flat peripheral portion being divided into a number of sectors by radial kerfs extending inwardly from the circumference to said conoidal portion and friction pads mounted alternately on opposite faces of said sectors.

4. A device of the kind described which comprises a circular plate having a flat peripheral portion divided into sectors by radial kerfs extending inwardly from the circumference, friction pads mounted alternately on opposite faces of said sectors and driving pressure plates on opposite sides of said plate adapted to be advanced toward each other to grip and flex said sectors as said plates press against said friction pads.

5. A device of the kind described which comprises a circular plate having a flat peripheral portion divided into sectors by radial kerfs extending inwardly from the circumference and friction pads mounted alternately on opposite faces of said sectors, said friction pads having the faces adjacent said disc bevelled toward their ends.

6. A device of the kind described which comprises a circular plate having a flat peripheral portion divided into short, stiff, resilient sectors by kerfs extending inwardly from the circumference and friction pads mounted alternately on opposite faces of said disc sectors, said pads being in the shape of segments of an annular ring and having their inner faces adjacent said disc bevelled toward their radial ends.

7. A friction pad for devices of the kind described which comprises a segment of an annular strip of suitable friction material one face of which is tapered or bevelled toward its radial ends.

In witness whereof we have hereunto set our hands at Long Island City, county of Queens, New York this 21st day of April, 1922.

ALFRED T. STURT.
GEORGE H. ROBINSON.